(12) United States Patent
Kim et al.

(10) Patent No.: US 11,973,242 B2
(45) Date of Patent: Apr. 30, 2024

(54) GAS REMOVAL DEVICE FOR SECONDARY BATTERY, AND GAS REMOVAL METHOD USING SAME

(71) Applicant: LG ENERGY SOLUTION, LTD., Seoul (KR)

(72) Inventors: Sang Jih Kim, Daejeon (KR); Joon Sung Bae, Daejeon (KR); Beom Koon Lee, Daejeon (KR); Dong Hun Bae, Daejeon (KR); Eui Kyung Lee, Daejeon (KR); Suk Hyun Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 206 days.

(21) Appl. No.: 17/419,064

(22) PCT Filed: Jul. 22, 2020

(86) PCT No.: PCT/KR2020/009648
§ 371 (c)(1),
(2) Date: Jun. 28, 2021

(87) PCT Pub. No.: WO2021/025337
PCT Pub. Date: Feb. 11, 2021

(65) Prior Publication Data
US 2022/0077537 A1   Mar. 10, 2022

(30) Foreign Application Priority Data

Aug. 5, 2019 (KR) .................. 10-2019-0094967

(51) Int. Cl.
*H01M 50/317* (2021.01)
*H01M 10/04* (2006.01)
*H01M 50/105* (2021.01)

(52) U.S. Cl.
CPC ..... *H01M 50/317* (2021.01); *H01M 10/0404* (2013.01); *H01M 50/105* (2021.01)

(58) Field of Classification Search
CPC .......... H01M 50/317; H01M 10/0404; H01M 50/105; H01M 10/52; H01M 50/394
See application file for complete search history.

(56) References Cited

U.S. PATENT DOCUMENTS

2012/0080477 A1* 4/2012 Leimbach ............. H01M 10/42
227/175.2
2013/0244093 A1   9/2013 Min et al.
(Continued)

FOREIGN PATENT DOCUMENTS

CN   102692341 A   9/2012
CN   203359556 U   12/2013
(Continued)

OTHER PUBLICATIONS

Btiernay. (Jun. 20, 2019). What are the differences between hole punching, notching and drilling?. Metal Supermarkets. https://www.metalsupermarkets.com/differences-between-hole-punching-notching-and-drilling/ (Year: 2019).*
(Continued)

*Primary Examiner* — Matthew T Martin
*Assistant Examiner* — Grace Ann Kenlaw
(74) *Attorney, Agent, or Firm* — Birch, Stewart, Kolasch & Birch, LLP (57) ABSTRACT

A degassing apparatus for a secondary battery, and a degassing method using same, is provided. The degassing apparatus includes a drive motor and a jig arm configured to pressurize a first surface of a gas pocket of a battery cell and a second surface opposite the first surface by controlling a separation distance by the operation of a driving motor. The degassing apparatus is capable of performing an effective
(Continued)

degassing and sealing process for the battery cell without positional movement of the battery cell during cell activation or after cell activation.

14 Claims, 5 Drawing Sheets

(56) References Cited

U.S. PATENT DOCUMENTS

| | | | |
|---|---|---|---|
| 2015/0086817 | A1 | 3/2015 | Chung et al. |
| 2016/0308181 | A1 | 10/2016 | Kato et al. |

FOREIGN PATENT DOCUMENTS

| | | | | |
|---|---|---|---|---|
| CN | 104134771 | A | | 11/2014 |
| CN | 104380514 | A | | 2/2015 |
| CN | 105453328 | A | | 3/2016 |
| CN | 105489924 | A | | 4/2016 |
| CN | 108621057 | A | | 10/2018 |
| CN | 108808141 | A | | 11/2018 |
| CN | 108808145 | A | * 11/2018 | .......... H01M 10/446 |
| CN | 109478874 | A | | 3/2019 |
| EP | 2 876 724 | A1 | | 5/2015 |
| EP | 3 474 363 | A1 | | 4/2019 |
| JP | 2005-256498 | A | | 9/2005 |
| JP | 2015-526851 | A | | 9/2015 |
| JP | 2015-220199 | A | | 12/2015 |
| JP | 2016-122492 | A | | 7/2016 |
| JP | 2017-69079 | A | | 4/2017 |
| KR | 10-2012-0060707 | A | | 6/2012 |
| KR | 10-2014-0130869 | A | | 11/2014 |
| KR | 10-1748362 | B1 | | 6/2017 |
| KR | 10-2017-0104206 | A | | 9/2017 |
| KR | 10-2019-0055585 | A | | 5/2019 |
| KR | 10-2019-0074591 | A | | 6/2019 |
| WO | WO 2015/087760 | A1 | | 6/2015 |

OTHER PUBLICATIONS

International Search Report (PCT/ISA/210) issued in PCT/KR2020/009648 mailed on Oct. 29, 2020.
Japanese Office Action for Japanese Application No. 2021-535174, dated Nov. 29, 2022, with an English translation.
Extended European Search Report for European Application No. 20850725.1, dated Feb. 25, 2022.

* cited by examiner

GAS REMOVAL DEVICE FOR SECONDARY BATTERY, AND GAS REMOVAL METHOD USING SAME

TECHNICAL FIELD

This application claims the benefit of priority based on Korean Patent Application No. 10-2019-0094967, filed on Aug. 5, 2019, and the entire contents of the Korean patent application are incorporated herein by reference.

The present invention relates to a degassing apparatus of a secondary battery for removing gas inside a battery cell, and a degassing method using the same.

BACKGROUND ART

As the price of energy sources increases due to the depletion of fossil fuels, and interest in environmental pollution is amplified, the demand for eco-friendly alternative energy sources is increasing. In particular, as technology development and demand for mobile devices increase, the demand for secondary batteries as energy sources is rapidly increasing.

Regarding the shape of the secondary battery, there is a high demand for a pouch-type secondary battery or a prismatic secondary battery in that it can be applied to mobile products such as mobile phones with a small thickness. In recent years, the demand for pouch-type secondary batteries is gradually increasing. Pouch-type secondary batteries are widely used as they have excellent physical properties, relatively low manufacturing cost and weight, and easy shape transformation properties.

Such a pouch-type secondary battery has a structure in which a stack-type or stack/folding-type electrode assembly is embedded in a pouch-shaped battery case formed of an aluminum laminate sheet. Specifically, in the pouch-type secondary battery, a stack-type or stack-folding electrode assembly in which a positive electrode, a separator, and a negative electrode are sequentially stacked is accommodated in the battery case. Each positive electrode and negative electrode is electrically connected by electrode tabs, and electrode leads that are drawn out are connected to the electrode tabs. After the electrode assembly, to which the electrode tab and the electrode lead are connected, is accommodated in a pouch-type battery case, an electrolyte is injected, and the battery case is sealed with part of the electrode lead exposed to the outside, to thereby assemble a pouch-type secondary battery.

The assembled secondary battery undergoes a cell activation process in the manufacturing process of the battery. The activation process is performed by applying a current to a predetermined voltage to the electrode assembly impregnated with an electrolyte. During the initial charging/discharging process for cell activation, a protective film is formed on the surface of the electrode and a part of the electrolyte is decomposed, thereby generating a large amount of gas.

The gas generated in the cell activation process is removed through a separate degassing process. However, the degassing process is complicated, and if sufficient degassing is not performed, a secondary battery may become defective.

DISCLOSURE

Technical Problem

The present invention improves the conventional degassing process, and an object of the present invention is to provide a degassing apparatus of a secondary battery for removing gas inside a battery cell, and a degassing method using the same, capable of effectively removing the gas inside the battery cell.

Technical Solution

In order to achieve the above objects, a degassing apparatus of a secondary battery according to the present invention includes: a drive motor; and a jig arm configured to pressurize a first surface of a gas pocket of the battery cell and a second surface of the gas pocket opposite to the first surface by controlling a space within the jig arm by the drive motor.

Specifically, the inside of the jig arm includes:
  a piercing unit including a through member configured to form a through hole in the gas pocket;
  a sealing unit configured to seal a periphery of the through hole formed by the through member;
  a pad unit surrounding the sealing unit and being configured to block an inflow of external gas and moisture into the through hole when in contact with the gas pocket; and
  a vacuum forming unit configured to such air inside the area enclosed by the pad unit when in contact with the gas pocket.

In one example, the jig arm includes a pair of arms extending from the drive motor and being arranged to face each other, and the sealing unit and the pad unit are respectively formed in a shape corresponding to each other on the pair of arms.

In a specific example, the through member is configured to move back and forth in a direction penetrating the gas pocket when the jig arm presses the gas pocket from opposite sides.

In another specific example, the through member is configured to protrude from the inside of the jig arm in order to penetrate the gas pocket when the jig arm the first surface of the gas pocket and the second surface of the gas pocket.

In another specific example, the through member of the piercing unit may have a straight or cross-shaped cross-section, and the through member rotate about an axis of the through member.

In one example, the sealing unit may include a pressurizing pad configured to surround the periphery of the through hole of the gas pocket to pressurize the gas pocket and a heating wire located inside the pressurizing pad.

In one example, the pad unit is configured to surround the periphery of the through hole when in contact with the gas pocket to block the inflow of external gas and moisture when the jig arm pressurizes the first surface of the gas pocket and the second surface of the gas pocket.

In one example, the vacuum forming unit may include: a fluid discharge passage configured to suck and discharge gas in the area enclosed by the pad unit when the pad unit contacts the gas pocket; and a depressurizing pump for to depressurize the fluid discharge passage.

In a specific example, the piercing unit includes a receiving portion in which the through member is accommodated, and the fluid discharge passage of the vacuum forming unit is connected to the receiving portion.

Further, in another example, according to the degassing apparatus of the secondary battery according to the present invention, the piercing unit includes a receiving portion in which the through member is accommodated, the vacuum forming unit includes a fluid discharge passage, the fluid discharge passage is connected to the receiving portion, the sealing unit surrounds the receiving portion, and the pad unit surrounds a periphery of the sealing unit.

In addition, the present invention provides a degassing method of a secondary battery using the degassing apparatus described above.

In one example, the secondary battery degassing method according to the present invention includes:
  a step of forming a through hole in a gas pocket of a battery cell and a step of removing gas inside the gas pocket when the jig arm first pressurizes a first surface of the gas pocket and a second surface of the gas pocket opposite to the first surface; and
  a step of sealing the gas pocket by the sealing unit surrounding the periphery of the through hole of the gas pocket formed by the through member of the piercing unit when the jig arm pressurizes the first surface of the gas pocket and the second surface of the gas pocket a second time.

In one example, the step of removing the gas inside the gas pocket is performed when the inflow of external gas and moisture is blocked by the contact between the pad unit and the gas pocket.

In a specific example, the step of removing gas inside the gas pocket is performed by discharging the gas inside the gas pocket through the through hole while air inside the area enclosed by the pad unit and the gas pocket is depressurized by the vacuum forming unit.

For example, in the step of removing the gas inside the gas pocket, the gas is discharged through the through hole of the battery cell gas pocket is discharged to an outside through a fluid discharge passage of the vacuum forming unit.

In another example, the step of sealing the battery cell is performed by heating and pressing the gas pocket with the sealing unit.

Advantageous Effects

According to a degassing apparatus of a secondary battery for removing gas inside a battery cell, and a degassing method using the same according to the present invention, it is possible to perform an effective degassing and sealing process for the battery cell even if the location of the battery cell having undergone the cell activation process or during the process is not moved.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Hereinafter, the present invention will be described in detail.

The secondary battery degassing apparatus according to the present invention can be applied to, for example, a pouch-type battery cell manufacturing process. The pouch-type secondary battery has a structure in which a stack-type or stack/folding-type electrode assembly is embedded in a pouch-shaped battery case formed of an aluminum laminate sheet. The assembled secondary battery undergoes a cell activation process in the manufacturing process of the battery. The cell activation process is performed by applying a current to a predetermined voltage to the electrode assembly impregnated with an electrolyte.

During the initial charging/discharging process for cell activation, a protective film is formed on the surface of the electrode and a part of the electrolyte is decomposed, thereby generating a large amount of gas. In order to remove the generated gas inside the battery cell, a surplus portion is formed on one side of the battery case of the pouch-type battery cell. Gas pockets are formed as the gas inside the battery cell is collected in the surplus portion of the battery case. After opening one side of the gas pocket to discharge the internal gas, the battery cell is sealed again.

The secondary battery degassing apparatus according to the present invention may be perform the process of discharging the gas inside the battery cell and sealing the gas discharge port of the battery cell at the same time through a simple process of contacting the jig arm on both sides of the gas pocket of the battery cell formed during the cell activation process. In particular, in the secondary battery degassing apparatus according to the present invention, a process of moving a mounting position during a cell activation process or in order to apply a battery cell, on which the above process has been completed, to a degassing process, may be omitted.

In one example, the secondary battery degassing apparatus according to the present invention includes a drive motor; and a jig arm that presses one surface of a battery cell gas pocket and the other surface opposite to the one surface by controlling a spaced distance by driving the driving motor.

Specifically, the inside of the jig arm in contact with the battery cell includes:
  a piercing unit including a through member forming a through hole in the gas pocket of the battery cell;
  a sealing unit sealing the periphery of the through hole of the battery cell formed by the through member;
  a pad unit surrounding the sealing unit and blocking the inflow of external gas and moisture by being in close contact with the battery cell; and
  a vacuum forming unit sucking air inside the area enclosed by the pad unit in close contact with the battery cell.

The secondary battery degassing apparatus according to the present invention includes a drive motor and a jig arm that presses one surface of a battery cell gas pocket and the other surface opposite to the one surface by controlling a spaced distance by driving the driving motor. The jig arm is composed of a pair of arms facing each other, and if necessary, a plurality of jig arms may be arranged to simultaneously perform a degassing process for a plurality of battery cells.

The jig arms have a structure facing each other to press both sides of the battery cell, and specifically, press the gas pocket of the battery cell from both sides. The inside of the jig arm in contact with the battery cell has a structure including a piercing unit; a sealing unit; a pad unit; and a vacuum forming unit.

The piercing unit includes a through member forming a through hole in a gas pocket of the battery cell, and gas inside the battery cell is discharged through the through hole formed by the through member. The gas inside the battery cell contains various chemical substances and also contains components that are harmful to the human body. Therefore, there is a need for a shielding structure that prevents the internal gas of the discharged battery cell from contacting the outside air.

The pad unit has a structure surrounding the through hole of the battery cell, and the pad unit is in close contact with the battery cell to block the inflow of external gas and moisture, and also prevent the discharged internal gas of the battery cell from leaking to the outside.

The vacuum forming unit serves to depressurize the inner space partitioned by the close contact between the battery cell and the pad unit. The gas inside the battery cell is discharged through the through hole formed by the through member, and the discharged battery cell internal gas is collected through a vacuum forming unit and separated and discharged in a state blocked from outside air.

A sealing unit is located between the piercing unit and the pad unit. When the discharge of the gas inside the battery cell is completed, the sealing unit performs a role of sealing the periphery of the through hole formed in the battery cell gas pocket. The sealing is performed by heating and pressing the battery cells around the through holes from both sides.

In one example, the jig arm includes a pair of arms extending from a drive motor and facing each other. In addition, the sealing unit and the pad unit may be formed in a shape corresponding to each other in the pair of arms. The sealing unit and the pad unit are respectively formed in a shape corresponding to each other on the two arms, and sealing and shielding the outside air are respectively performed while the jig arm presses the battery cell.

The secondary battery degassing apparatus according to the present invention includes a piercing unit including a through member forming a through hole in a gas pocket of a battery cell. The through member is not particularly limited and may be modified in various forms as long as it passes through the battery cell gas pocket and forms a hole for discharging the internal gas.

In one example, the through member has a structure that moves back and forth in a direction penetrating the gas pocket of the battery cell while the jig arm presses the gas pocket of the battery cell from both sides. For example, in a state that the jig arm first presses the gas pocket of the battery cell from both sides, the through member advances to form a through hole in the battery cell gas pocket. Then, the through member is separated from the through hole through backward movement.

In another example, the through member has a structure protruding to penetrate the battery cell gas pocket in a state that the jig arm pressurizes one side of the battery cell and the other side facing the one side. Specifically, when the jig arm first presses the battery cell gas pocket from both sides, the protruding through member forms a through hole in the battery cell gas pocket. The through member may have a hollow structure in which a slit is formed on a side surface, or may have a straight or cross-shaped cross-section.

In another example, the through member may have a straight or cross-shaped cross-sectional structure, and the through member may have a structure that rotates about the axis of the through member while penetrating the gas pocket of the battery cell. For example, when a through member having a straight cross section penetrates the battery cell gas pocket and rotates in the axial direction in this state, a circular through hole is formed in the battery cell gas pocket.

In the present invention, the sealing unit serves to seal the periphery of the through hole of the battery cell formed by the through member. In one example, the sealing unit may include a pressurizing pad that surrounds the through hole of the battery cell gas pocket and pressurizes the battery cell in close contact with the battery cell; and a hot wire formed inside the pressurizing pad. In this case, the sealing unit pressurizes the periphery of the through hole of the battery cell by the pressurizing pad, and at the same time heats the pressurized portion through the hot wire built in the pressurizing pad. In the present invention, for the battery cell in which the internal gas has been removed, the periphery of the through hole of the battery cell is sealed through the sealing unit. Accordingly, the secondary battery degassing apparatus according to the present invention does not require a separate process or member for sealing the gas discharge passage after the degassing process for the battery cell.

The secondary battery degassing apparatus according to the present invention isolates the inside of the area enclosed by the pad unit in close contact with the battery cell through the pad unit, from the outside. Further, the gas inside the area partitioned by the battery cell and the pad unit is sucked and separately discharged through the vacuum forming unit.

In one example, the pad unit has a structure that surrounds the periphery of the through hole of the battery cell gas pocket and is in close contact with the battery cell to block the inflow of external gas and moisture, in a state that the jig arm pressurizes one side of the battery cell gas pocket and the other side facing the one side. The pad unit is in close contact with the battery cell to block the inflow of external gas and moisture and at the same time prevent the gas inside the battery cell from flowing out.

In another example, the vacuum forming unit may include: a fluid discharge passage for sucking and discharging gas in an area partitioned by a battery cell and a pad unit in close contact with the battery cell; and a depressurizing pump for forming a depressurization in the fluid discharge passage. For example, the piercing unit includes a receiving portion in which the through member is accommodated, and the fluid discharge passage of the vacuum forming unit is connected to the receiving portion in which the through member is accommodated. Through this, when the gas inside the battery cell is discharged through the through hole of the battery cell gas pocket formed by the through member, the discharged gas is sucked and separately discharged through a fluid discharge passage connected to the through member. In addition, the depressurizing pump may be used without special limitation, provided that internal depressurization is formed through a fluid discharge passage, and, for example, a rotary pump may be applied.

In a specific example, according to the secondary battery degassing apparatus according to the present invention, at the inner side where the jig arm contacts the battery cell, the piercing unit includes a through member and a receiving portion in which the through member is accommodated, the vacuum forming unit includes a fluid discharge passage, and the fluid discharge passage is connected to a receiving portion in which the through member is accommodated. In addition, the sealing unit has a shape surrounding the receiving portion in which the piercing unit is accommodated, and the pad unit has a shape surrounding the sealing unit.

In addition, the present invention provides a degassing method of a secondary battery using the degassing apparatus described above.

In one example, the secondary battery degassing method according to the present invention includes:

forming a through hole in a gas pocket of a battery cell and removing gas inside the battery cell therefrom, in a state that the jig arm first pressurizes one surface of the gas pocket and the other surface opposite to the one surface; and sealing the battery cell by heating and pressing the battery cell in a form that the sealing unit surrounds the periphery of the hole of the battery cell formed by the through member of the piercing unit, in a state that the jig arm second pressurizes one side of the battery cell gas pocket and the other side opposite to the one side.

In the present invention, the pair of arms forming the jig arm has a structure extending from the drive motor, and the pair of arms is opposed to each other to press both sides of the battery cell gas pocket. Specifically, the pair of arms has a structure fastened to share one axis at one end close to the drive motor, and one end of the opposite side has a structure that changes its position so as to move away or close while changing the angle around the axis.

In addition, in the present invention, first and second pressurizations are divided according to the degree of pressurization. The second pressurization refers to a case where the degree of pressurization is higher than that of the first pressurization. During the first pressurization, the pair of arms pressurizes both sides of the battery cell gas pocket with a relatively low pressure. During the second pressurization, the pair of arms pressurizes both sides of the battery cell gas pocket with a relatively high pressure. For example, the angle formed by the pair of arms during the first pressurization is in the range of about 3 to 5°, and the angle formed by the pair of arms during the second pressurization is in the range of 1.5° or less. The angle formed by the pair of arms at the time of the second pressurization is substantially close to 0°. For example, the angle is greater than 0° and equal to or less than 1.5°.

In one example, the step of removing the gas inside the secondary battery is performed in a state in which the inflow of external gas and moisture is blocked due to close contact between the pad unit and the battery cell.

Specifically, in the step of removing the gas inside the secondary battery, the inside of the area partitioned by the close contact between the pad unit and the battery cell is depressurized by the vacuum forming unit. Further, a through hole is formed in the battery cell gas pocket by the through member of the piercing unit, and the gas inside the battery cell is discharged through the through hole.

For example, in the step of removing the gas inside the secondary battery, the gas inside the battery cell discharged through the through hole of the battery cell gas pocket is discharged to the outside through the fluid discharge passage of the vacuum forming unit.

In another example, the step of sealing the battery cell is performed by heating and pressing in a form surrounding the through hole of the battery cell gas pocket.

Hereinafter, the present invention will be described in more detail through drawings and the like, but the scope of the present invention is not limited thereto. Further, in describing the drawings, similar reference numerals are used for similar elements. In the accompanying drawings, the dimensions of the structures are shown in an enlarged scale for clarity of the invention. The terms used to describe various components are for understanding, and the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

Figure 1:
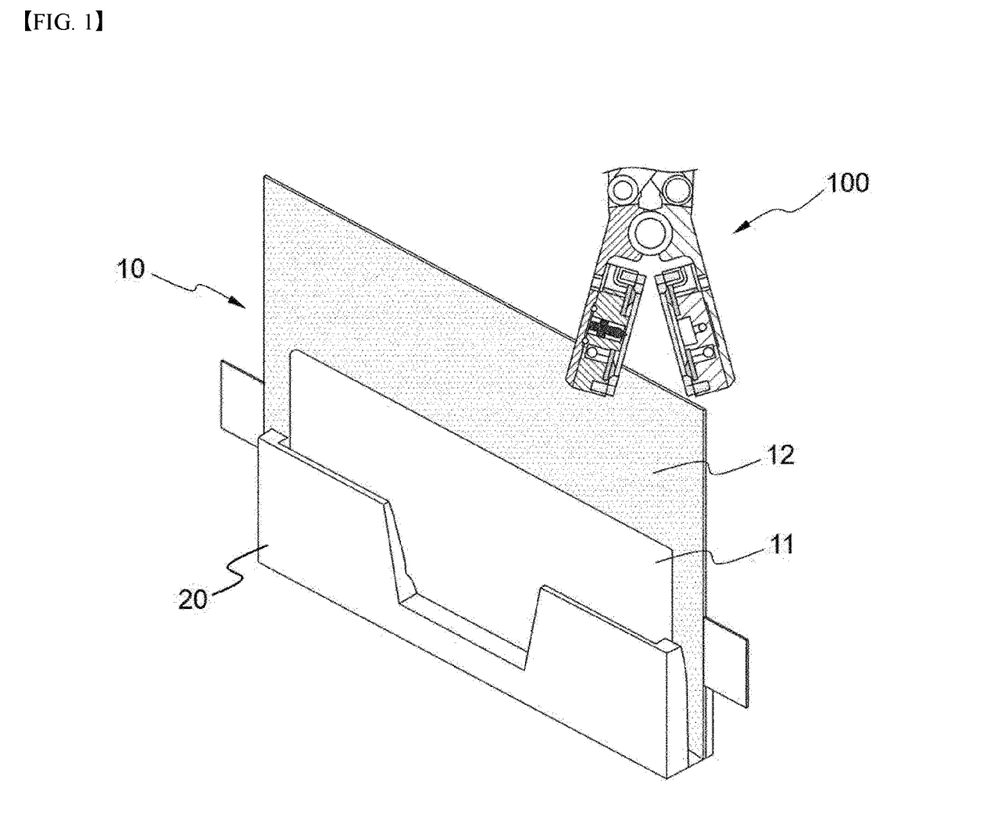
FIG. 1 is a schematic diagram schematically showing a state of use of a degassing apparatus of a secondary battery according to an embodiment of the present invention.

FIG. 1 is a schematic diagram schematically showing a state of use of a degassing apparatus of a secondary battery according to an embodiment of the present invention. Referring to FIG. 1, the secondary battery degassing apparatus 100 according to the present invention can be applied to a pouch-type battery cell 10 manufacturing process. The pouch-type battery cell 10 has a structure in which an electrode assembly is embedded in a pouch-type battery case formed of an aluminum laminate sheet. Specifically, the battery case includes an electrode assembly receiving portion 11 in which the electrode assembly is accommodated on one side. In addition, a battery case surplus portion 12 is formed on one side of the battery case opposite to the electrode assembly receiving portion 11 in order to collect gas generated during the activation process of the battery cell 10.

The assembled battery cell 10 undergoes a cell activation process of applying a current to a predetermined voltage to an electrode assembly impregnated with an electrolyte. Typically, the pouch-type battery cell 10 undergoes an activation process while being vertically mounted on a cradle 20. During the initial charging/discharging process for cell activation, a protective film is formed on the surface of the electrode and a part of the electrolyte is decomposed, thereby generating a large amount of gas. The generated gas inside the battery cell 10 is collected in the battery case surplus portion 12 to form a gas pocket. Conventionally, after opening one side of the gas pocket to discharge the internal gas, the battery cell is sealed again.

However, the secondary battery degassing apparatus 100 according to the present invention can effectively remove internal gas of the battery cell during or after undergoing a cell activation process the cell activation process. Specifically, the apparatus 100 may perform a process of discharging the gas inside the battery cell 10 through a simple process of contacting the jig arm, and a process of sealing the through hole formed in the process of discharging the internal gas of the battery cell 10, at one time. In particular, in the secondary battery degassing apparatus 100 according to the present invention, the process of moving the mounting position may be omitted in order to apply the battery cell 10, on which the cell activation process has been completed, to the degassing process.

Figure 2:
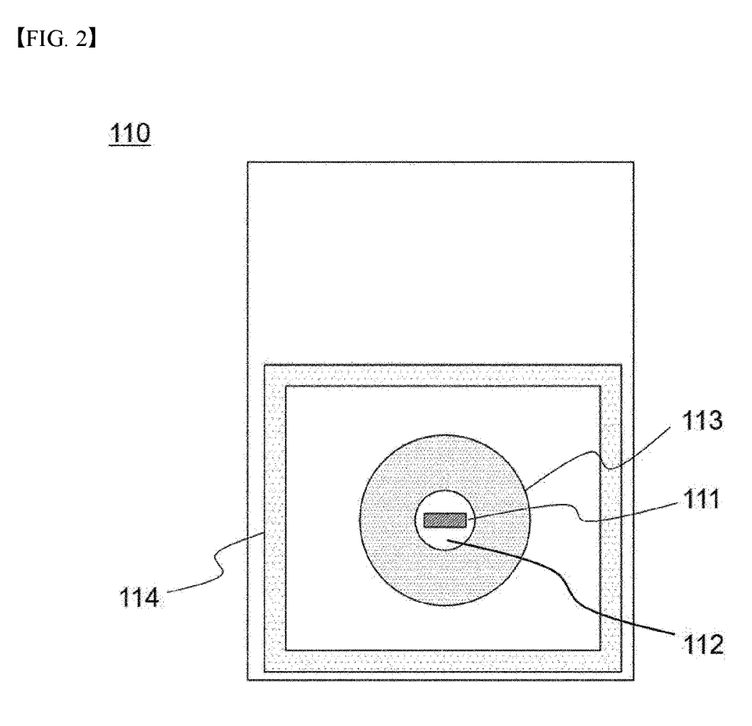
FIG. 2 is a front view showing the inside of a jig arm of a secondary battery degassing apparatus according to an embodiment of the present invention.

FIG. 2 is a front view showing the inside of a jig arm of a secondary battery degassing apparatus according to an embodiment of the present invention. Referring to FIG. 2, the inside of the jig arm 110 in contact with the battery cell includes a through member 111 forming a through hole in a gas pocket of a battery cell, a sealing block 113 sealing the periphery of the through hole of the battery cell formed by the through member 111, a vacuum pad 114 that surrounds the sealing block 113 and is in close contact with the battery cell to block the inflow of external gas and moisture, and a vacuum hole 112 for sucking air inside the area enclosed by the vacuum pad 114 in close contact with the battery cell.

First Embodiment of the Present Invention

In one embodiment of the present invention, the through member of the piercing unit has a blade structure having a straight cross section. The through member penetrates the gas pocket of the battery cell while the jig arm presses one surface of the battery cell and the other surface opposite to the one surface. The through member forms a through hole in the gas pocket of the battery cell by performing a back-and-forth movement or a rotational movement while penetrating the gas pocket of the battery cell.

For example, when a through member having a straight cross section passes through a battery cell gas pocket and then falls back to the rear of the penetrating direction through a forward and backward movement, the through hole remains in the corresponding portion. In another example, when a through member having a straight cross section penetrates the battery cell gas pocket and rotates in the axial direction in this state, a circular through hole is formed in the battery cell gas pocket.

Second Embodiment of the Present Invention

In another embodiment of the present invention, the through member of the piercing unit has a hollow structure in which a slit is formed on a side surface in a longitudinal direction. The through member penetrates the gas pocket of the battery cell while the jig arm presses one surface of the battery cell and the other surface opposite to the one surface. Since the through member has a hollow structure and a slit is formed in the longitudinal direction, gas inside the battery cell is discharged to the outside of the battery cell through the slit of the through member.

Figure 3:
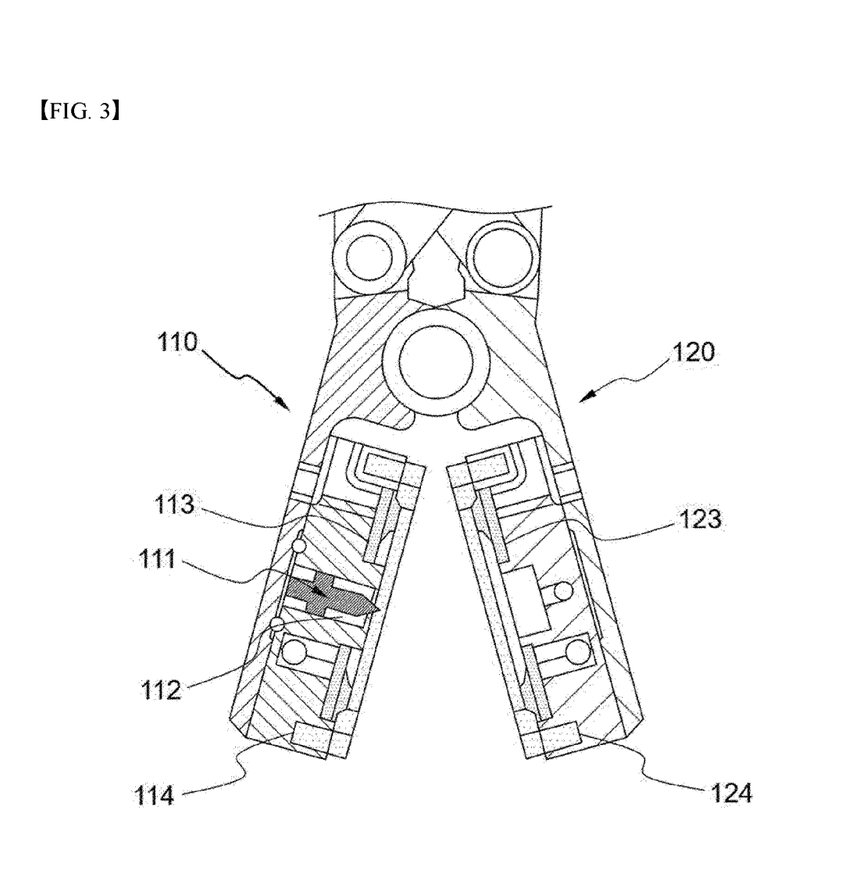
FIGS. 3 to 5 are views showing an operation process of a degassing apparatus of a secondary battery according to an embodiment of the present invention.
Figure 4:
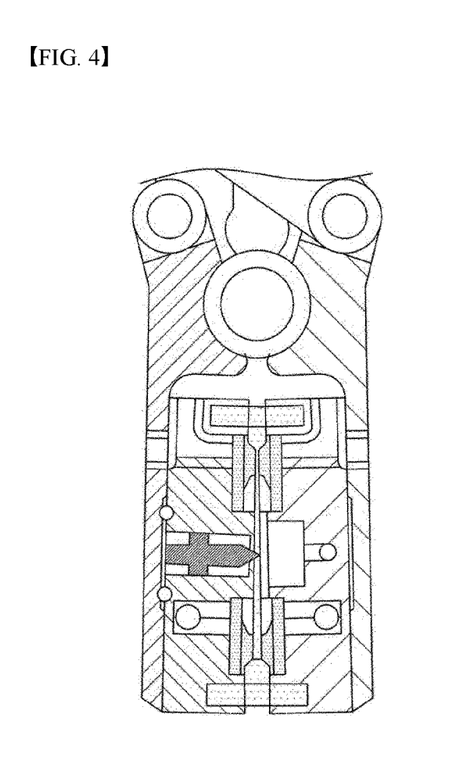
Figure 5:
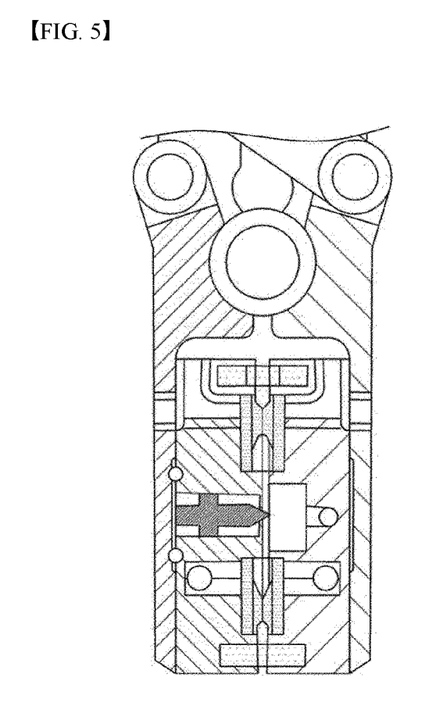

FIGS. 3 to 5 are views showing an operation process of a degassing apparatus of a secondary battery according to an embodiment of the present invention. FIGS. 3 to 5 are sequentially reviewed as follows.

First, FIG. 3 shows a case in which the secondary battery degassing apparatus is in a standby state. The secondary battery degassing apparatus includes a drive motor (not shown) and jig arms 110 and 120 whose spaced distance is controlled by driving the drive motor. The jig arms 110 and 120 are composed of two arms facing each other, and each arm pressurizes one side of the battery cell gas pocket and the other side facing the one side. The jig arms 110 and 120 are composed of a pair of arms facing each other, and a plurality of jig arms 110 and 120 are arranged as needed to simultaneously perform a degassing process for a plurality of battery cells. The upper end of the pair of jig arms 110 and 120 has a structure that is fastened to share one axis with each other, and one end of the opposite side has a structure that changes its position so as to move away or close while changing the angle around the axis.

The inner side of the left jig arm 110 in contact with the battery cell includes: a piercing unit including a through member 111; a vacuum forming unit including a vacuum hole 112 formed to communicate with the piercing unit; a sealing unit including a sealing block 113 having a structure surrounding the piercing unit; and a pad unit including a vacuum pad 114 having a structure surrounding the sealing unit. The right jig arm 120 has a structure in which a blocking block for preventing the advancement of the through member 111 is formed at a position corresponding to the piercing unit. In addition, a sealing unit including a sealing block 123 of the right jig arm 120; and a pad unit including a vacuum pad 124 are formed at positions corresponding to the left jig arm 110, respectively.

FIG. 4 shows a state in which the secondary battery degassing apparatus first presses the gas pocket of the battery cell. In FIG. 4, a pair of jig arms 110 and 120 of the secondary battery degassing apparatus facing each other are in a state that is about 4° apart. The spaced angle between the jig arms 110 and 120 may vary depending on the size of the battery cell, the volume of the gas pocket, and outside air conditions such as temperature and humidity.

When the jig arms 110 and 120 contact the battery cell, the inner space is partitioned by the close contact between the vacuum pad 114 and the battery cell. Inflow of external gas or moisture is blocked in the partitioned inner space, and at the same time, the outflow of gas from the partitioned inner space to the outside is also blocked. As the vacuum pad 114 is in close contact with the battery cell, the through member 111 forms a through hole penetrating the gas pocket of the battery cell. In this case, the vacuum hole 112 has a structure connected to the receiving portion in which the through member 111 is accommodated. The gas inside the battery cell discharged through the through hole is sucked through the vacuum hole 112.

FIG. 5 shows a state in which the secondary battery degassing apparatus second presses the gas pocket of the battery cell. When the discharge of the gas inside the battery cell is completed, the pair of jig arms 110 and 120 facing each other of the secondary battery degassing apparatus are additionally pressurized. In this case, the spaced angle between the jig arms 110 and 120 is about 1.5° or less, and becomes substantially 0° level. In the second pressurization state, the sealing blocks 113 and 123 of the jig arms 110 and 120 are in close contact with each other in a state where the battery case is interposed therebetween. The sealing blocks 113 and 123 have a structure in which a heating wire is embedded. The battery case is in the form where two aluminum laminate sheets overlap with each other. The battery case in the area, to which the sealing blocks 113 and 123 are in close contact, undergoes a sealing process while being pressed and heated. Through this, the periphery of the through hole of the battery case is sealed.

DESCRIPTION OF SYMBOLS

10: battery cell
11: electrode assembly receiving portion
12: battery case surplus portion
20: cradle
100: degassing apparatus
110, 120: jig arm
111: through member
112: vacuum hole
113, 123: sealing block
114, 124: vacuum pad

The invention claimed is:

1. A degassing apparatus of a battery cell, the degassing apparatus comprising:
    a drive motor; and
    a jig arm configured to pressurize a first surface of a gas pocket of the battery cell and a second surface of the gas pocket opposite to the first surface by controlling a space within the jig arm by the drive motor,
    wherein an inside of the jig arm comprises:
    a piercing unit including a through member configured to form a through hole in the gas pocket;
    a sealing unit configured to seal a periphery of the through hole formed by the through member; and a pad unit surrounding the sealing unit, the pad unit being configured to block an inflow of external gas into the through hole when in contact with the gas pocket; and a vacuum forming unit configured to suck air inside an area enclosed by the pad unit when in contact with the gas pocket, wherein the jig arm includes a pair of arms extending from the drive motor, the arms being arranged to face each other, wherein the sealing unit and the pad unit are respectively formed in a shape corresponding to each other on the pair of arms, and wherein the pair of jig arms are pivotable with respect to each other.

2. The degassing apparatus of claim 1, wherein the through member is configured to move back and forth in a direction penetrating the gas pocket when the jig arm presses the gas pocket from opposite sides.

3. The degassing apparatus of claim 1, wherein the through member is configured to protrude from the inside of the jig arm in order to penetrate the gas pocket when the jig arm presses the first surface of the gas pocket and the second surface of the gas pocket.

4. The degassing apparatus of claim 1, wherein the through member has a straight or cross-shaped cross-section, the through member being configured to rotate about an axis of the through member.

5. The degassing apparatus of claim 1, wherein the sealing unit includes:

a pressurizing pad configured to surround the periphery of through hole of the gas pocket to pressurize the gas pocket; and a heating wire located inside the pressurizing pad.

6. The degassing apparatus of claim 1, wherein the pad unit is configured to surround the periphery of the through hole when in contact with the gas pocket to block the inflow of external gas and moisture when the jig arm pressurizes the first surface of the gas pocket and the second surface of the gas pocket.

7. The degassing apparatus of claim 1, wherein the vacuum forming unit includes:

a fluid discharge passage configured to suck and discharge gas in the area enclosed by the pad unit when the pad unit contacts the gas pocket; and a depressurizing pump to depressurize the fluid discharge passage.

8. The degassing apparatus of claim 7, wherein the piercing unit includes a receiving portion in which the through member is accommodated, and the fluid discharge passage of the vacuum forming unit is connected to the receiving portion.

9. The degassing apparatus of claim 1, wherein the piercing unit includes a receiving portion in which the through member is accommodated, wherein the vacuum forming unit includes a fluid discharge passage, wherein the fluid discharge passage is connected to the receiving portion, wherein the sealing unit surrounds the receiving portion, and wherein the pad unit surrounds a periphery of the sealing unit.

10. A degassing method of a battery cell using the degassing apparatus according to claim 1, the degassing method comprising:

a step of forming the through hole in the gas pocket of the battery cell and a step of removing gas inside the gas pocket when the jig arm first pressurizes the first surface of the gas pocket and the second surface of the gas pocket; and a step of sealing the battery cell by the sealing unit surrounding the periphery of the through hole of the gas pocket formed by the through member of the piercing unit when the jig arm pressurizes the first surface of the gas pocket and the second surface of the gas pocket a second time.

11. The degassing method of claim 10, wherein the step of removing the gas inside the gas pocket is performed when the inflow of external gas and moisture is blocked by the contact between the pad unit and gas pocket.

12. The degassing method of claim 11, wherein the step of removing gas inside the gas pocket is performed by discharging the gas inside the gas pocket through the through hole while air inside the area enclosed by the pad unit and the gas pocket is depressurized by the vacuum forming unit.

13. The degassing method of claim 12, wherein, in the step of removing the gas inside the gas pocket, the gas is discharged through the through hole of the gas pocket of the battery cell to an outside through a fluid discharge passage of the vacuum forming unit.

14. The degassing method of claim 10, wherein the step of sealing the battery cell is performed by heating and pressing the gas pocket with the sealing unit.

* * * * *